(12) United States Patent
Hida

(10) Patent No.: US 12,359,098 B2
(45) Date of Patent: Jul. 15, 2025

(54) COMPOSITE STRUCTURE AND DOUBLE-SIDED ADHESIVE TAPE

(71) Applicant: SEKISUI CHEMICAL CO., LTD., Osaka (JP)

(72) Inventor: Tomohiro Hida, Moriyama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 965 days.

(21) Appl. No.: 17/439,983

(22) PCT Filed: Mar. 18, 2020

(86) PCT No.: PCT/JP2020/011887
§ 371 (c)(1),
(2) Date: Sep. 16, 2021

(87) PCT Pub. No.: WO2020/189700
PCT Pub. Date: Sep. 24, 2020

(65) Prior Publication Data
US 2022/0169896 A1 Jun. 2, 2022

(30) Foreign Application Priority Data
Mar. 18, 2019 (JP) .................................. 2019-050410

(51) Int. Cl.
*B32B 3/10* (2006.01)
*B32B 7/12* (2006.01)
(Continued)

(52) U.S. Cl.
CPC ................ *C09J 7/385* (2018.01); *B32B 7/12* (2013.01); *B32B 27/12* (2013.01); *B32B 27/281* (2013.01);
(Continued)

(58) Field of Classification Search
None
See application file for complete search history.

(56) References Cited

U.S. PATENT DOCUMENTS

| | | |
|---|---|---|
| 2017/0218232 A1 | 8/2017 | Niwa et al. |
| 2018/0360169 A1 | 12/2018 | Tanaka |

FOREIGN PATENT DOCUMENTS

| | | |
|---|---|---|
| CN | 107709494 | 2/2018 |
| CN | 108697207 | 10/2018 |

(Continued)

OTHER PUBLICATIONS

Machine translation of JP-6352219-B2 (Year: 2018).*

(Continued)

*Primary Examiner* — Christopher M Polley
(74) *Attorney, Agent, or Firm* — Wenderoth, Lind & Ponack, L.L.P.

(57) ABSTRACT

Provided is a composite structure capable of bonding a fabric and a synthetic resin material with good workability without affecting the texture of the fabric and having sufficient load-withstanding performance at a very high temperature.

The composite structure comprising a synthetic resin material, a fabric, and a double-sided adhesive tape that is disposed between the synthetic resin material and the fabric and bonds them together, the composite structure having a shear strength at 140° C. 15 mN/mm² or more.

7 Claims, 2 Drawing Sheets

(51) Int. Cl.
    *B32B 27/12* (2006.01)
    *B32B 27/28* (2006.01)
    *C09J 7/38* (2018.01)
    *C09J 133/08* (2006.01)

(52) U.S. Cl.
    CPC ......... *C09J 133/08* (2013.01); *B32B 2250/02* (2013.01); *B32B 2262/0276* (2013.01); *B32B 2307/542* (2013.01); *B32B 2307/732* (2013.01)

(56) References Cited

FOREIGN PATENT DOCUMENTS

| | | | | | |
|---|---|---|---|---|---|
| EP | 2036961 | A2 | * | 3/2009 | ............ C09J 7/0239 |
| JP | 8-60132 | | | 3/1996 | |
| JP | 9-25470 | | | 1/1997 | |
| JP | 9-136368 | | | 5/1997 | |
| JP | 2009-18778 | | | 1/2009 | |
| JP | 4502722 | | | 7/2010 | |
| JP | 2011127034 | A | * | 6/2011 | ........... B32B 27/308 |
| JP | 2015-145510 | | | 8/2015 | |
| JP | 2016-3257 | | | 1/2016 | |
| JP | 2017-133002 | | | 8/2017 | |
| JP | 2017-206677 | | | 11/2017 | |
| JP | 6352219 | | | 7/2018 | |
| JP | 6352219 | B2 | * | 7/2018 | ............ C09J 133/08 |

OTHER PUBLICATIONS

Machine translation of JP-2011127034-A (Year: 2011).*
Machine translation of EP-2036961-A2 (Year: 2009).*
International Search Report (ISR) issued Jun. 9, 2020 in International (PCT) Application No. PCT/JP2020/011887.

* cited by examiner

COMPOSITE STRUCTURE AND DOUBLE-SIDED ADHESIVE TAPE

TECHNICAL FIELD

The present invention relates to a composite structure comprising a synthetic resin material, a fabric, and a double-sided adhesive tape for adhering these together, and a double-sided adhesive tape for adhering a synthetic resin material and a fabric together.

BACKGROUND ART

Bonding a fabric to a synthetic resin material has been practiced in various fields for the purpose of protecting the surface of the synthetic resin material and decorating the synthetic resin material surface. For example, in the fields of vehicles, housings, and electronic devices, synthetic resin materials to which a fabric is bonded are often required to be heat resistant in line with the higher performance of recent years and, for example, sufficient load-withstanding performance is required at 100° C. or more, and in some cases, even at a very high temperature of 140° C. or more.

A fabric, as having the rough surface, is known to be bonded to a resin layer by impregnating inside the fabric with an adhesive such as a hot-melt adhesive and a liquid adhesive. For example, PTL1 discloses a laminate sheet of a nonwoven skin material laminated on a non-foam layer made of a thermoplastic resin, wherein the non-foam layer and the nonwoven skin material are adhered via an adhesive layer comprising a hot-melt adhesive, a liquid adhesive and the like.

The adhesion of a fabric and a synthetic resin material is also known as, for example, laminating a film on the back face of a decorative sheet comprising a fabric and the like and bonding the sheet to a synthetic resin material through the film as disclosed in PTL2. Further, for example, PTL3 discloses an adhesion layer to be laminated on a fiber layer which comprises an acrylic-based block copolymer.

CITATION LIST

Patent Literature

PTL1: JP 2009-18778 A
PTL2: JP 4502722 B
PTL3: JP 2017-206677 A

SUMMARY OF INVENTION

Technical Problem

However, as in PTL1, when the inside of a fabric is impregnated with an adhesive and then the fabric is bonded to a resin material, the adhesive bleeds out to the fabric surface and reduces the texture of the fabric, which is inconvenient. Additionally, a hot-melt adhesive often has an insufficient adhesion force at high temperature environment.

Meanwhile, when a film is bonded to the back face of a fabric as in PTL 2, the texture of the fabric is assured but the bonding of the fabric and the film requires integral molding and the like thereby reducing the workability. Additionally, the fabric, when the film is bonded thereto, poses a problem of loss of formability, conformability and the like.

Further, PTL3 shows an aspect of assuring the texture of a fiber material, but an adhesive is laminated on the fiber material by thermal lamination. That is, the adhesive of PTL3 has an insufficient pressure-sensitive adhesion property and requires a cumbersome work for bonding. Further, PTL3 shows a high interlayer adhesion strength between the adhesive and the fiber material but does not show a high adhesion strength at high temperature environment or suggest sufficient load-withstanding performance at, for example, a very high temperature of about 140° C.

Under the circumstances, the present invention aims to provide a composite structure comprising a synthetic resin material, a fabric, and a double-sided adhesive tape for adhering these together, the composite structure capable of bonding the fabric and the synthetic resin material with good workability without affecting the texture of the fabric and having sufficient load-withstanding performance even at a very high temperature.

Solution to Problem

The present inventor conducted extensive studies and found as a result that the above problems can be solved when a double-sided adhesive tape is used for bonding a synthetic resin material and a fabric, and a shear strength at 140° C. of the composite structure is a predetermined value or more, whereby the following present invention has come to accomplishment. That is, the present invention provides the following [1] to [11].

[1] A composite structure comprising a synthetic resin material, a fabric, and a double-sided adhesive tape that is disposed between the synthetic resin material and the fabric and bonds them together, the composite structure having a shear strength at 140° C. of 15 mN/mm$^2$ or more.
[2] The composite structure according to the above [1], wherein the double-sided adhesive tape is a base material-free double-sided adhesive tape.
[3] The composite structure according to the above [1] or [2], wherein the double-sided adhesive tape is adhered directly to the fabric.
[4] The composite structure according to any one of the above [1] to [3], wherein the double-sided adhesive tape has a thickness of 100 μm or less.
[5] The composite structure according to any one of the above [1] to [4], wherein the double-sided adhesive tape is bonded throughout the entire fabric.
[6] The composite structure according to any one of the above [1] to [5], wherein the fabric is a polyester fiber fabric.
[7] The composite structure according to any one of the above [1] to [6], wherein the synthetic resin material is a polyimide-based resin.
[8] The composite structure according to any one of the above [1] to [7], wherein the double-sided adhesive tape comprises a pressure-sensitive adhesive layer made of an acrylic pressure-sensitive adhesive.
[9] The composite structure according to the above [8], wherein the acrylic pressure-sensitive adhesive comprises an acrylic-based polymer (A), and
   the acrylic-based polymer (A) is a copolymer of monomer components comprising 100 parts by mass of an alkyl (meth)acrylate monomer (A1) and 4 to 18 parts by mass of a carboxyl group-containing monomer (X1).
[10] The composite structure according to the above [8] or [9], wherein the acrylic pressure-sensitive adhesive comprises an acrylic-based polymer (A), and the acrylic-based polymer (A) has a weight-average molecular weight of 300000 to 2000000 and a degree of dispersion of 2.5 or less.
[11] A double-sided adhesive tape for adhering a synthetic resin material and a fabric together, the double-sided adhesive tape having a shear strength at 140° C. of 15 mN/mm² or more as measured by using a standard resin sample formed of a polyimide resin and a standard fabric sample formed of a polyester fiber fabric bonded via the double-sided adhesive tape.

Advantageous Effects of Invention

The present invention can provide a composite structure comprising a synthetic resin material, a fabric, and a double-sided adhesive tape for adhering these together, the composite structure capable of bonding the fabric and the synthetic resin material with good workability without affecting the texture of the fabric and having sufficient load-withstanding performance even at a very high temperature.

DESCRIPTION OF EMBODIMENTS

[Composite Structure]

Figure 1:
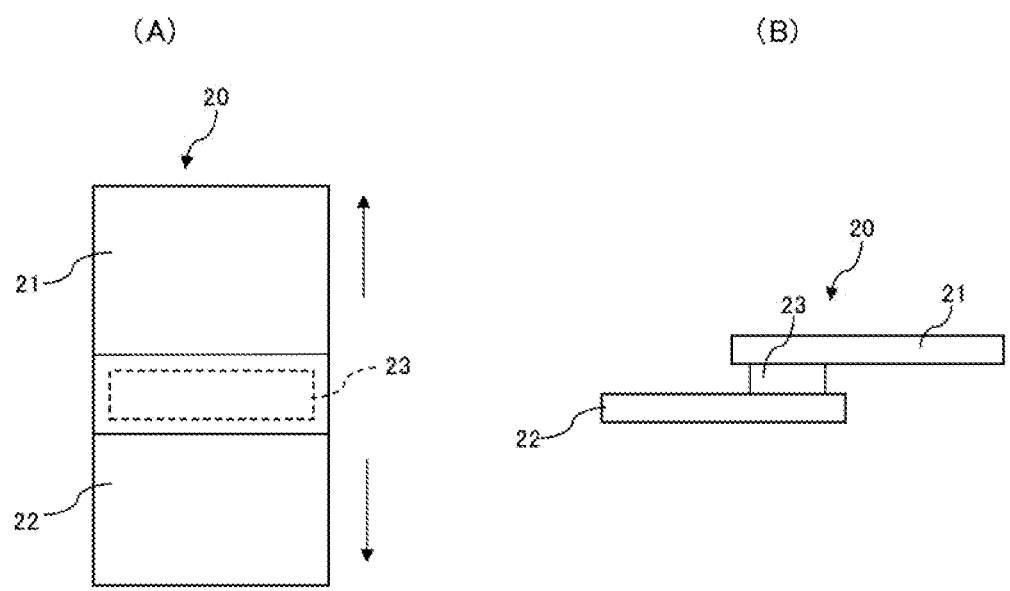
FIG. 1 shows an evaluation sample for measuring a shear strength at 140° C., wherein FIG. 1 (A) is a plan view and FIG. 1 (B) is a side view.

The composite structure of the present invention comprises a synthetic resin material, a fabric, and a double-sided adhesive tape that is disposed between the synthetic resin material and the fabric and bonds them together, and has a shear strength at 140° C. of 15 mN/mm² or more.

The composite structure of the present invention is a composite structure of a material having the rough face such as a fabric and a synthetic resin material but still having good load-withstanding performance even at a very high temperature of about 140° C. For this reason, even when a strong load is applied to the composite structure, inconveniences such as a fabric and a synthetic resin material being peeled off or slipping out of position are less likely caused.

Additionally, the use of a double-sided adhesive tape enables to achieve good workability when a synthetic resin material and a fabric are bonded. Specifically, the adhesion force (shear strength) can be increased immediately after a synthetic resin material and a fabric are bonded, and further a double-sided adhesive tape, even when laminated onto a fabric in advance and stored for an extended period of time, can still be bonded. Furthermore, the use of a double-sided adhesive tape can also prevent an adhesive and the like from bleeding out to the fabric surface and reducing the texture of a fabric.

The composite structure, when having a shear strength at 140° C. of less than 15 mN/mm², has insufficient load-withstanding performance at a very high temperature, and when a large load or an impact is applied, inconveniences such as a fabric and a synthetic resin material being peeled off or slipping out of position are caused.

The shear strength at 140° C. of the composite structure is, from a viewpoint of imparting excellent load-withstanding performance at a very high temperature, preferably 15 mN/mm² or more, more preferably 25 mN/mm² or more, and further preferably 35 mN/mm² or more. Further, the shear strength at 140° C. of the composite structure is, from a viewpoint of production easiness and practicality, for example, preferably 500 mN/mm² or less, more preferably 300 mN/mm² or less, and further preferably 100 mN/mm² or less.

The shear strength of the composite structure can be determined by preparing the same synthetic resin material, fabric, and double-sided adhesive tape as those used in the composite structure, creating an evaluation sample using these and measuring a shear strength of such an evaluation sample. Details of a method for creating an evaluation sample and a method for measuring a shear strength are as shown in Example to be described later.

Hereinafter, each of the members constituting the composite structure will be described in more detail.

[Double-Sided Adhesive Tape]

The double-sided adhesive tape is used to bond a synthetic resin material and a fabric. The double-sided adhesive tape is not limited as long as it can be a thin layer between a synthetic resin material and a fabric and can be formed by being applied onto either one of a synthetic resin material and a fabric as to be described later, but it is preferable to bond a pre-made double-sided adhesive tape to a synthetic resin material or a fabric.

The double-sided adhesive tape can be a base material-free double-sided adhesive tape or a double-sided adhesive tape with a base material but is preferably a base material-free double-sided adhesive tape. The use of a base material-free double-sided adhesive tape can make the thickness of the double-sided adhesive tape thinner along with better conformability to a fabric, thereby easily increasing a shear strength at 140° C. described above.

A base material-free double-sided adhesive tape consists of a pressure-sensitive adhesive layer. When a base material-free double-sided adhesive tape is used as the double-sided adhesive tape, both faces of the single pressure-sensitive adhesive layer supposedly adhere to a synthetic resin material and a fabric, respectively.

A double-sided adhesive tape with a base material comprises a base material and pressure-sensitive adhesive layers respectively provided on both faces of the base material, and one of the pressure-sensitive adhesive layers is adhered to a synthetic resin material and the other pressure-sensitive adhesive layer to a fabric. When the double-sided adhesive tape has a base material, the base material is not particularly limited and, for example, plastic films such as a nonwoven fabric, polyethylene, polyethylene terephthalate, polypropylene, and polyurethane, and a metallic foil can be used. The thickness of the base material is not particularly limited and is, from a viewpoint of assuring a certain strength and thinness of the double-sided adhesive tape, preferably 10 to 50 μm.

In the present invention, examples of the pressure-sensitive adhesive constituting each of the pressure-sensitive adhesive layers of the double-sided adhesive tape include an acrylic pressure-sensitive adhesive, a urethane-based pressure-sensitive adhesive, a rubber-based pressure-sensitive adhesive, a silicone-based pressure-sensitive adhesive, and a polyester-based pressure-sensitive adhesive. Of these, an acrylic pressure-sensitive adhesive is preferable from a viewpoint of easily assuring a shear strength at a very high temperature and a viewpoint of low VOC in vehicles.

Hereinafter, the case where an acrylic pressure-sensitive adhesive is used as the pressure-sensitive adhesive will be described in detail.

(Acrylic-Based Polymer (A))

The acrylic pressure-sensitive adhesive comprises an acrylic-based polymer (A). The acrylic-based polymer (A) is a polymer of monomer components comprising at least an acrylic-based monomer. The acrylic-based polymer (A) is preferably a polymer having a polar group.

The polar group has active hydrogen and is preferably a functional group reactable to a cross-linking agent (B) to be described later, and specifically includes a carboxyl group, a hydroxyl group, and an amino group. Of these functional groups, at least one selected from the group consisting of carboxyl groups and hydroxyl groups is preferable, and it is more preferable to contain a carboxyl group. Carboxyl groups and hydroxyl groups have high reactivity to the cross-linking agent (B) to be described later and can easily form a cross-linking structure. Additionally, when the acrylic-based polymer (A) having a highly polar carboxyl group is used, the acrylic-based polymer (A) in the pressure-sensitive adhesive layer chemically bonds to the surface of a fabric thereby easily enhancing a shear strength at a very high temperature.

Examples of the acrylic-based polymer (A) specifically include a copolymer of an alkyl (meth)acrylate monomer (A1) and a polar group-containing monomer (A2), or a copolymer of the above monomers (A1) and (A2) and a monomer (A3) other than (A1) and (A2). Of these, a copolymer of an alkyl (meth)acrylate monomer (A1) and a polar group-containing monomer (A2) is preferable.

The (meth)acrylate is used as the term to mean either one of acrylate and methacrylate, or both of them, and the same applies to other similar terms.

Examples of the alkyl (meth)acrylate monomer (A1) include methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, n-octyl (meth)acrylate, isooctyl (meth)acrylate, isononyl (meth)acrylate, isomyristyl (meth)acrylate, stearyl (meth)acrylate, cyclohexyl (meth)acrylate, and isobornyl (meth)acrylate.

The monomer (A1) can be used singly, or 2 or more monomers can be used in combination.

Of the monomers (A1), from a viewpoint of enhancing a shear strength at a very high temperature, alkyl (meth)acrylates in which an alkyl group has 1 to 12 carbon atoms are preferable, and it is more preferable to comprise alkyl acrylate in which an alkyl group has 2 to 8 carbon atoms. The alkyl acrylate in which an alkyl group has 2 to 8 carbon atoms is, on a basis of the total amount of the monomer (A1), preferably 50 to 100 mass %, more preferably 70 to 100 mass %, and further preferably 90 to 100 mass %.

Of the polar group-containing monomer (A2), examples of the monomers containing a carboxyl group (hereinafter, also referred to as "the carboxyl group-containing monomer (X1)") include acrylic acid, methacrylic acid, and crotonic acid. Of these, at least one selected from the group consisting of acrylic acid and methacrylic acid is preferable from a viewpoint of enhancing a shear strength described above, and acrylic acid is more preferable.

Further, of the polar group-containing monomer (A2), examples of the monomers containing a hydroxyl group (hereinafter, also referred to as "the hydroxyl group-containing monomer (X2)") include (meth)acrylates having a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 5-hydroxypentyl (meth)acrylate, and 6-hydroxyhexyl (meth)acrylate, and allyl alcohol. Of these, from a viewpoint of enhancing a shear strength, (meth)acrylates having a hydroxyl group are preferable, and 2-hydroxyethyl (meth)acrylate is more preferable.

The polar group-containing monomer (A2) can be used singly, or 2 or more monomers can be used in combination.

The polar group-containing monomer (A2) is preferably at least one selected from the group consisting of the carboxyl group-containing monomers (X1) and the hydroxyl group-containing monomers (X2), and it is more preferable to comprise at least the carboxyl group-containing monomers (X1). Further, the at least one selected from the group consisting of the carboxyl group-containing monomers (X1) and the hydroxyl group-containing monomers (X2) is preferably at least one selected from the group consisting of acrylic acid, methacrylic acid, and 2-hydroxyethyl (meth) acrylate.

The monomer (A3) other than the above (A1) and (A2) is not particularly limited as long as it is copolymerizable with the monomers (A1) and (A2), and examples include styrene derivatives such as styrene, α-methyl styrene, p-methyl styrene, p-chloro styrene, and divinylbenzene, compounds having a vinyl ester group such as vinyl acetate, and vinyl propionate, N-vinylpyrrolidone, N-vinylmorpholine, (meth)acrylonitrile, N-cyclohexylmaleimide, N-phenylmaleimide, N-laurylmaleimide, N-benzylmaleimide, n-propyl vinyl ether, n-butyl vinyl ether, isobutyl vinyl ether, and tert-butyl vinyl ether. The monomer (A3) can be used singly, or 2 or more monomers can be used in combination.

The amount of the monomer components used in the acrylic-based polymer (A) relative to 100 parts by mass of the alkyl (meth)acrylate monomer (A1) ranges preferably 1 to 20 parts by mass, more preferably 3 to 18 parts by mass, further preferably 5 to 15 parts by mass, and furthermore preferably 5 to 11 parts by mass of the polar group-containing monomer (A2). When an amount of the polar group-containing monomer (A2) used is within the above ranges, the cross-linking reaction of the polar group and the cross-linking agent (B) easily proceeds. Additionally, a shear strength at a very high temperature is easily enhanced.

Further, as described above, the polar group-containing monomer (A2) preferably comprises the carboxyl group-containing monomer (X1). The content of the carboxyl group-containing monomer (X1) in the monomer components constituting the acrylic-based polymer (A) relative to 100 parts by mass of the alkyl (meth)acrylate monomer (A1) ranges preferably 3 to 18 parts by mass, more preferably 3 to 15 parts by mass, and further preferably 5 to 11 parts by mass. When an amount of the carboxyl group-containing monomer (X1) used is within the above ranges, a shear strength at a very high temperature is easily enhanced. Additionally, the cross-linking reaction of the polar group and the cross-linking agent (B) easily proceeds.

The amount of the monomer (A3) other than (A1) and (A2) used relative to 100 parts by mass of the alkyl (meth)acrylate monomer (A1) is preferably 20 parts by mass or less, more preferably 10 parts by mass or less, further preferably 5 parts by mass or less, and furthermore preferably 2 parts by mass or less.

The total amount of the monomer (A1) and the monomer (A2) in the all monomer components used in the acrylic-based polymer (A) is, from a viewpoint of imparting good adhesion performance of the pressure-sensitive adhesive layer and enhancing a shear strength described above, preferably 80 mass % or more, more preferably 90 mass % or more, and further preferably 95 mass % or more. The upper limit is 100 mass %.

The acrylic-based polymer (A) has a weight-average molecular weight (Mw) of preferably 300000 to 2000000, more preferably 500000 to 2000000, further preferably 600000 to 1500000, and furthermore preferably 700000 to 1100000. When a weight-average molecular weight is within the above ranges, the adhesive performance of the pressure-sensitive adhesive layer is enhanced thereby easily imparting a good shear strength at a very high temperature. The weight-average molecular weight can be adjusted by adjusting the amount of a polymerization initiator used and polymerization conditions such as polymerization temperature or selecting a polymerization method.

The weight-average molecular weight is a standard polystyrene-based weight-average molecular weight measured by gel permeation chromatography (GPC).

Further, in the present invention, the degree of dispersion (Mw/Mn) of the acrylic-based polymer (A) is preferably low from a viewpoint of easily adjusting a shear strength at a very high temperature to a predetermined value or more. The degree of dispersion (Mw/Mn) of the acrylic-based polymer (A) is, for example, 10 or less, and preferably 7.5 or less, but is, from a viewpoint of increasing a shear strength at a very high temperature, more preferably 2.5 or less, and further preferably 2.0 or less. Additionally, the degree of dispersion (Mw/Mn) is, from a viewpoint of production easiness, preferably 1.1 or more. The degree of dispersion (Mw/Mn) can be measured by the same method as the weight-average molecular weight.

It is particularly preferable, from a viewpoint of enhancing a shear strength at a very high temperature while thinning the double-sided adhesive tape, to reduce a degree of dispersion Mw/Mn while increasing a molecular weight of the acrylic-based polymer (A). Thus, from such viewpoints, it is particularly preferable for a weight-average molecular weight (Mw) to be 300000 to 2000000, more preferably 500000 to 2000000, further preferably 600000 to 1500000, and furthermore preferably 700000 to 1100000 while for a degree of dispersion to be 2.5 or less, and more preferably 2.0 or less. Additionally, it is particularly preferable to adjust a content of the carboxyl group-containing monomer (X1) to be within the above ranges while adjusting a degree of dispersion and a weight-average molecular weight to be within these ranges.

The acrylic-based polymer (A) is the main component of the acrylic pressure-sensitive adhesive and is typically, relative to the whole amount (non-volatile content based) of the acrylic pressure-sensitive adhesive, 50 mass % or more, preferably 55 to 98 mass %, and more preferably 60 to 95 mass %.

The acrylic-based polymer (A) can be obtained by polymerizing the monomer components described earlier by the free radical polymerization method or the living radical polymerization method. Of these, the living radical polymerization method is preferable from a viewpoint of keeping down a degree of dispersion while increasing a molecular weight. Examples of the polymerization method include solution polymerization (boiling point polymerization or constant temperature polymerization), emulsion polymerization, suspension polymerization, and bulk polymerization.

In the free radical polymerization method, the monomer components are polymerized in the presence of a polymerization initiator. Examples of the polymerization initiator include an organic peroxide based polymerization initiator and an azo-based polymerization initiator.

Examples of the organic peroxide-based polymerization initiator include cumene hydroperoxide, benzoyl peroxide, lauroyl peroxide, octanoyl peroxide, stearoyl peroxide, o-chlorobenzoyl peroxide, acetyl peroxide, t-butyl hydroperoxide, t-butyl peroxyacetate, t-butyl peroxyisobutyrate, 3,5,5-trimethylhexanoyl peroxide, t-butylperoxy-2-ethylhexanoate, and di-t-butyl peroxide.

Examples of the azo-based polymerization initiator include 2,2'-azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), 1,1-azobis(cyclohexane-1-carbonytrile), 1-[(1-cyano-1-methylethyl)azo]formamide, 4,4'-azobis(4-cyanovaleric acid), dimethyl-2,2'-azobis(2-methylpropionate), dimethyl-1,1'azobis(1-cyclohexanecarboxylate), 2,2'-azobis{2-methyl-N-[1,1'-bis(hydroxymethyl)-2-hydroxyethyl]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), 2,2'-azobis(N-cyclohexyl-2-methylpropionamide), 2,2'-azobis[2-(2-imidazolin-2-yl)propane]dihydrochloride, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(2-amidinopropane)dihydrochloride, 2,2'-azobis[N-(2-carboxyethyl)-2-methylpropionamidine] tetrahydrate, 2,2'-azobis(1-imino-1-pyrrolidino-2-methylpropane)dihydrochloride, and 2,2'-azobis(2,4,4-trimethylpentane).

The polymerization initiator can be used singly, or 2 or more initiators can be used in combination.

The amount of the polymerization initiator used relative to 100 parts by mass of the monomer components is preferably 0.01 to 10 parts by mass, and more preferably 0.05 to 2 parts by mass.

For carrying out the polymerization, a chain transfer agent can be used other than the polymerization initiator. The chain transfer agent is preferably a thiol compound, and examples include lauryl mercaptan, 2-mercaptoethanol, β-mercaptopropionic acid, octyl β-mercaptopropionate, methoxybutyl mercaptopropionate, trimethylolpropane tris (β-thiopropionate), and butyl thioglycolate; propanethiols; buthanethiols: and thiophosphites.

The chain transfer agent can be used singly, or 2 or more agents can be used in combination. The amount of a chain transfer agent used relative to 100 parts by mass of the monomer components is preferably 0.01 to 5 parts by mass, and more preferably 0.05 to 2 parts by mass.

The living radical polymerization preferably uses an organic tellurium polymerization initiator. The organic tellurium polymerization initiator is not particularly limited as long as it is generally used for a living radical polymerization, and examples include an organic tellurium compound and an organic telluride compound.

Examples of the above organic tellurium compound include (methylteranyl-methyl)benzene, (1-methylteranyl-ethyl)benzene, (2-methylteranyl-propy)benzene, 1-chloro-4-(methylteranyl-methyl)benzene, 1-hydroxy-4-(methylteranyl-methyl)benzene, 1-methoxy-4-(methylteranyl-methyl)benzene, 1-amino-4-(methylteranyl-methyl)benzene, 1-nitro-4-(methylteranyl-methyl)benzene, 1-cyano-4-(methylteranyl-methyl)benzene, 1-methylcarbonyl-4-(methylteranyl-methyl)benzene, 1-phenylcarbonyl-4-(methylteranyl-methyl)benzene, 1-methoxycarbonyl-4-(methylteranyl-methyl)benzene, 1-phenoxycarbonyl-4-(methylteranyl-methyl)benzene, 1-sulfonyl-4-(methylteranyl-methyl)benzene, 1-trifluoromethyl-4-(methylteranyl-methyl)benzene, 1-chloro-4-(1-methylteranyl-ethyl)benzene, 1-hydroxy-4-(1-methylteranyl-ethyl)benzene, 1-methoxy-4-(1-methylteranyl-ethyl)benzene, 1-amino-4-(1-methylteranyl-ethyl)benzene, 1-nitro-4-(1-methylteranyl-ethyl)benzene, 1-cyano-4-(1-methylteranyl-ethyl)benzene, 1-methylcarbonyl-4-(1-methylteranyl-ethyl)benzene, 1-phenoxycarbonyl-4-(1-methylteranyl-ethyl)benzene, 1-methoxycarbonyl-4-(1-methylteranyl-ethyl)benzene, 1-phenoxycarbonyl-4-(1-methylteranyl-ethyl)benzene, 1-sulfonyl-4-(1-methylteranyl-ethyl)benzene, 1-trifluoromethyl-4-(1-methylteranyl-ethyl)benzene, 1-chloro1-4-(2-methylteranyl-propyl)benzene, 1-hydroxy-4-(2-methylteranyl-propyl)benzene, 1-methoxy-4-(2-methylteranyl-propyl)benzene, 1-amino-4-(2-methylteranyl-propyl)benzene, 1-nitro-4-(2-methylteranyl-propyl)benzene, 1-cyano-4-(2-methylteranyl-propyl)benzene, 1-methylcarbonyl-4-(2-methylteranyl-propyl)benzene, 1-phenylcarbonyl-4-(2-methylteranyl-propyl)benzene, 1-methoxycarbonyl1-4-(2-methylteranyl-propyl)benzene, 1-phenoxycarbonyl-4-(2-methylteranyl-propyl)benzene, 1-sulfonyl-4-(2-methylteranyl-propyl)benzene, 1-trifluoromethyl-4-(2-methylteranyl-propyl)benzene, 2-(methylteranyl-methyl)pyridine, 2-(1-methylteranyl-ethyl)pyridine, 2-(2-methylteranyl-propyl)pyridine, 2-methylteranyl-methyl ethanoate, 2-methylteranyl-methyl propionate, 2-methylteranyl-2-methyl methylpropionate, 2-methylteranyl-ethyl ethanoate, 2-methylteranyl-ethyl propionate, 2-methylteranyl-2-ethyl methylpropionate, 2-methylteranyl acetonitrile, 2-methylteranyl propionitrile, and 2-methyl-2-methylteranyl propionitrile. The methylteranyl group in these organic tellurium compounds can be an ethylteranyl group, an n-propylteranyl group, an isopropylteranyl group, an n-butylteranyl group, an isobutylteranyl group, a t-butylteranyl group, or a phenylteranyl group, and these organic tellurium compounds can be used singly, or 2 or more compounds can be used in combination.

Examples of the above organic telluride compound include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl ditelluride, dicyclobutyl ditelluride, diphenyl ditelluride, bis-(p-methoxyphenyl)ditelluride, bis-(p-aminophenyl)ditelluride, bis-(p-nitrophenyl)ditelluride, bis-(p-cyanophenyl)ditelluride, bis-(p-sulfonylphenyl)ditelluride, dinaphtyl ditelluride, and dipyridyl ditelluride. These organic telluride compounds can be used singly, or 2 or more compounds can be used in combination. Of these, dimethyl ditelluride, diethyl ditelluride, di-n propyl ditelluride, di-n-butyl ditelluride, and diphenyl ditelluride are preferable.

The azo-based polymerization initiator can be used in addition to the above organic tellurium polymerization initiator within the range of not affecting the effects of the present invention for the purpose of accelerating a polymerization rate. For the azo-based polymerization initiator, the compounds listed above can be used.

In the living radical polymerization, a dispersion stabilizer can be used. Examples of the dispersion stabilizer include polyvinylpyrrolidone, polyvinyl alcohol, methyl cellulose, ethyl cellulose, poly(meth)acrylic acid, poly(meth)acrylic acid ester, and polyethylene glycol.

(Cross-Linking Agent (B))

The acrylic pressure-sensitive adhesive of the present invention preferably comprises a cross-linking agent (B) in addition to the acrylic-based polymer (A) described above. The cross-linking agent (B) is, for example, a component capable of cross-linking the pressure-sensitive adhesive layer by the reaction with the polar group in the acrylic based polymer (A), thereby easily increasing a shear strength of the composite structure described above.

Examples of the cross-linking agent include an isocyanate-based cross-linking agent, an epoxy-based cross-linking agent, an aziridine-based cross-linking agent, and a metal chelate-based cross-linking agent. Of these, at least one selected from the group consisting of isocyanate-based cross-linking agents and epoxy-based cross-linking agents is preferable, and isocyanate-based cross-linking agents are more preferable.

The isocyanate-based cross-linking agent is not particularly limited as long as it is a compound having 2 or more isocyanate groups in a single molecule, and examples include tolylene diisocyanate, hexamethylene diisocyanate, xylene diisocyanate, 1,5-naphthalene diisocyanate, diphenylmethane diisocyanate, isophorone diisocyanate, xylene diisocyanate, and a tolylene diisocyanate adduct of trimethylol propane. Of these, tolylene diisocyanate and a tolylene diisocyanate adduct of trimethylol propane are preferable.

Examples of the commercial product of an isocyanate-based cross-linking agent include various polyisocyanate compounds such as Coronate L-45E, Coronate L-55E (manufactured by Tosoh Corporation), burette polyisocyanate compounds such as Sumidur N (manufactured by Sumitomo Bayer Urethane Co., Ltd.), polyisocyanate compounds having an isocyanurate ring such as Desmodur IL, HL (manufactured by Bayer AG), and Coronate EH (manufactured by Nippon Polyurethane Industry Co., Ltd.), and an adduct polyisocyanate compound such as Sumidur L (manufactured by Sumitomo Bayer Urethane Co., Ltd.), Coronate L and Coronate HL (manufactured by Nippon Polyurethane Industry Co., Ltd.).

The epoxy-based cross-linking agent is not particularly limited as long as it is a compound having 2 or more epoxy groups in a single molecule, and examples include diglycidyl aniline, diethylene glycol diglycidyl ether, propylene glycol diglycidyl ether, tripropylene glycol diglycidyl ether, 1,6-hexanediol diglycidyl ether, glycerol diglycidyl ether, trimethylolpropane triglycidyl ether, 1,3-bis(N,N-diglycidylaminoethyl)cyclohexane, and N,N,N',N'-tetraglycidyl-m-xylenediamine.

Examples of the commercial product of an epoxy-based cross-linking agent include E-AX and E-5C (manufactured by Soken Chemical & Engineering Co., Ltd.).

Examples of the aziridine-based cross-linking agent include N,N'-hexamethylene-1,6-bis(1-aziridine carboxyamide), trimethylolpropane-tri-β-aziridinyl propionate, N,N'-diphenylmethane-4,4'-bis(1-aziridine carboxyamide), and trimethylolpropane-tri-β-(2-methyl aziridine)propionate.

Additionally, examples of the metal chelate-based cross-linking agent include chelate compounds wherein a metal atom is aluminum, zirconium, titanium, zinc, iron, tin and the like, and aluminum chelate wherein the central metal is aluminum is preferable. Examples of the commercial product include Aluminum Chelate A and Aluminum Chelate M (manufactured by Kawaken Fine Chemicals Co., Ltd.).

The cross-linking agent can be used singly, or 2 or more agents can be used in combination.

The content of the cross-linking agent (B) in the acrylic pressure-sensitive adhesive can be suitably set in accordance with the type of the pressure-sensitive adhesive and is, for example, preferably 0.1 parts by mass or more, more preferably 0.5 parts by mass or more, further preferably 1.0 parts by mass or more, and furthermore preferably 1.5 parts by mass or more, relative to 100 parts by mass of the acrylic-based polymer (A). When a content of the cross-linking agent (B) is set to be these lower limit values or more, the adhesion property of the pressure-sensitive adhesive layer to the fabric becomes good, thereby easily increasing the shear strength described above. The upper limit of the content of the cross-linking agent (B) in the acrylic pressure-sensitive adhesive is not particularly limited and is, for example, 20 parts by mass, and preferably 15 parts by mass, relative to 100 parts by mass of the acrylic-based polymer (A).

(Tackifier Resin (C))

The acrylic pressure-sensitive adhesive preferably further comprises an tackifier resin (C) in addition to the acrylic-based polymer (A), or the acrylic-based polymer (A) and the cross-linking agent (B). Examples of the tackifier resin (C) include a rosin based resin, a terpene-based resin, a phenolic-based resin, a terpene phenolic based resin, a xylene-based resin, a coumarone-based resin, a ketone-based resin, and modified resins thereof.

Of these, from a viewpoint of enhancing the shear strength described above, the tackifier resin (C) is preferably at least one selected from the group consisting of rosin-based resins and terpene phenolic-based resins, and more preferably a rosin-based resin alone, or a combination use of a rosin-based resin and a terpene phenolic-based resin. Examples of the rosin-based resin include a polymerized rosin, a disproportionated rosin, and a hydrogenated rosin. The terpene phenolic-based resin is a resin having the terpene structure and the phenolic structure.

The tackifier resin (C) can be used singly, or 2 or more resins can be used in combination.

The content of the tackifier resin (C) in the acrylic pressure-sensitive adhesive relative to 100 parts by mass of the acrylic-based polymer (A) is preferably 1 to 50 parts by mass, more preferably 3 to 45 parts by mass, further preferably 4 to 40 parts by mass, and furthermore preferably 5 to 35 parts by mass. Within the above content ranges, a suitable shear strength can be imparted to the pressure-sensitive adhesive layer.

In the acrylic pressure-sensitive adhesive, additives added to a pressure-sensitive adhesive such as a filler, an antioxidant, a UV protector, a plasticizer, and a viscosity modifier can be suitably added within the range of not affecting the effects of the present invention.

Further, the acrylic pressure-sensitive adhesive can be diluted with an organic solvent and the like. The diluent solvent can be the solvent used when the acrylic-based polymer (A) is synthesized, or the solvent added after the acrylic-based polymer (A) was synthesized.

The thickness of the double-sided adhesive tape of the present invention is preferably 100 μm or less. A thickness of 100 μm or less can make the composite structure thinner thereby enabling a preferable use in small electronic devices. From such a viewpoint, the thickness of the double-sided adhesive tape is more preferably 75 μm or less, further preferably 50 μm or less, and furthermore preferably 40 μm or less. Further, the thickness of the double-sided adhesive tape is, from a viewpoint of assuring a certain shear strength, preferably 5 μm or more, more preferably 15 μm or more, and further preferably 20 μm or more. In the present invention, the double-sided adhesive tape preferably consists only of the pressure-sensitive adhesive layer as described above for imparting such a thinner thickness.

The thickness of the double-sided adhesive tape having a base material is the same as above, but the thickness of the pressure-sensitive adhesive layer to be bonded to the fabric side is preferably 20 μm or more.

In the composite structure, it is preferable that no other members such as a film for assisting adhesion be disposed between the double-sided adhesive tape and the fabric, but the double-sided adhesive tape be directly adhered to the fabric. In the present invention, even when the double-sided adhesive tape is directly adhered to the fabric, the double-sided adhesive tape is prevented from bleeding out to the fabric surface, thereby imparting good texture to the fabric.

Further, in the composite structure, the double-sided adhesive tape is preferably bonded throughout the entire fabric. The bonding throughout the entire fabric herein means that the double-sided adhesive tape is bonded to the substantially entire region (specifically, 95% or more of the region in terms of the area percentage) of the section (region) of the fabric overlaid on the synthetic resin material, and the double-sided adhesive tape is bonded to preferably 99% or more, and more preferably 100% of the region. When the double-sided adhesive tape is entirely bonded, the composite structure easily has increased load-withstanding performance at a very high temperature. Needless to say, the double-sided adhesive tape does not necessarily need to be bonded throughout the entire fabric and can be bonded to a part of the region of the fabric.

[Synthetic Resin Material]

The synthetic resin material used in the present invention can be any form such as a sheet, a block, and a film. As to be described later, the composite structure of the present invention is used for frameworks, housings or structural components around an engine, housings or structural components for a power source or other electronic parts, but the synthetic resin material can structure, for example, a part or a whole of housings, structural components or frameworks.

Example of the synthetic resin used in the synthetic resin material include polyolefin-based resins such as a polypropylene-based resin, polyester-based resins such as polybutylene terephthalate, and polyethylene terephthalate, a polyvinyl chloride-based resin, a polystyrene-based resin, an ABS-based resin, a polycarbonate-based resin, a polyphenylene sulfide-based resin, a polyimide-based resin, and a polyacrylonitrile.

Of these described above, a polyimide-based resin is preferable. The polyimide-based resin is a polymer comprising imide bonds as the repeating units, and examples include polyimide and polyimideamide. The polyimide-based resin is heat resistant, used near a heat source such as a heater and a power source as described above, and does not soften and is less likely to deteriorate even at a very high temperature of about 140° C. Additionally, the adhesion property to the acrylic pressure-sensitive adhesive is also good. For this reason, the shear strength at 140° C. described above is easily maintained increased.

[Fabric]

The fabric is not particularly limited, and examples include a nonwoven fabric, a woven fabric, and a knitted fabric. Of these, a woven fabric is preferable. Further, examples of the woven fabric include a double raschel woven fabric (for example, product name "Space Fabric", manufactured by SEIREN Co., LTD.) and a tulle fabric (for example, product name "Sillead", manufactured by Toray Industries, Inc.) The basis weight of the fabric is preferably 10 to 3000 g/m$^2$, and more preferably 50 to 1000 g/m$^2$. A basis weight of the fabric within the above ranges enables easy adjustment of a shear strength at a very high temperature to a predetermined range.

The fabric is preferable when one of the faces is smoother and has a smaller difference in height of projection and depression than the other face. The one of the faces means the face of the side on which the double-sided adhesive tape is adhered. The double-sided adhesive tape, due to such a structure, is supposedly adhered onto the relatively smooth face, thereby easily enhancing a shear strength. On the other hand, the other face will be the outer surface of the composite structure on which the double-sided adhesive tape is not adhered, and a relatively significant difference in height of projection and depression, when provided, is likely to impart the decorating property and the dressing property.

The fabric is preferably a fabric structured by a synthetic fiber, and specifically examples include a polyester fiber fabric, a polyamide fiber fabric, an acrylic fiber fabric, a rayon fiber fabric, and a polyvinyl chloride fiber fabric, of which a polyester fiber fabric is preferable. Examples of the polyester used in a polyester fiber fabric include polyethylene terephthalate and polybutylene terephthalate, with polyethylene terephthalate (PET) being preferable. The use of a polyester fiber fabric as the fabric imparts good adhesion property to the acrylic pressure-sensitive adhesive described above, thereby easily enhancing a shear strength at a very high temperature.

When the fabric is a nonwoven fabric, natural fibers such as cotton, hemp, and wool can be used.

[Use of the Composite Structure]

The composite structure of the present invention is used for various vehicle usages such as cars, housing usage, electronic device usage and the like. The composite structure is used, for example, at a location near a heat source, more specifically, used for frameworks, housings or structural components around an engine, and structural components or housings of a power source or other electronic parts radiating heat. The composite structure, due to the fabric, can protect and decorate the surface of the synthetic resin material. Particularly, the texture of the fabric maintained well in the present invention provides excellent decorating property and dressing property of the composite structure.

Further, the composite structure of the present invention provides excellent load-withstanding performance even when used near members under high temperature such as an engine and a power source as described above because a shear strength at 140° C. is increased.

[Method for Producing the Composite Structure]

The composite structure of the present invention can be obtained by preparing a synthetic resin material and a fabric and bonding these using a double-sided adhesive tape. During this operation, the double-sided adhesive tape is pre-laminated on one of the synthetic resin material and the fabric and then the synthetic resin material and the fabric are bonded via the double-sided adhesive tape, and pre-lamination on the fabric is preferable.

The double-sided adhesive tape can be formed, for example, by applying a pressure-sensitive adhesive onto either one of the synthetic resin material and the fabric and suitably heat-drying as needed, and a pre made double-sided adhesive tape is preferably bonded to the synthetic resin material or the fabric, and among them, bonding to the fabric is more preferable. The synthetic resin material or the fabric to which the double-sided adhesive tape has been bonded is further bonded to the fabric or the synthetic resin material via the double-sided adhesive tape, whereby the composite structure can be obtained.

The method for pre-making the double-sided adhesive tape is not particularly limited, and when the double sided adhesive tape consists only of a pressure-sensitive adhesive layer, a pressure-sensitive adhesive is applied onto a substrate such as a release sheet and suitably heat-dried as needed to form a pressure-sensitive adhesive layer. The pressure-sensitive adhesive layer (double-sided adhesive tape) formed on the substrate is bonded to the synthetic resin material or the fabric, and the substrate is released from the pressure-sensitive adhesive layer before bonding the synthetic resin material and the fabric via the double-sided adhesive tape.

Further, when the double-sided adhesive tape has a base material, a pressure-sensitive adhesive is applied onto both faces of the base material and then heat-dried to form a pressure-sensitive adhesive layer, whereby the double-sided adhesive tape can be produced.

The heat-drying conditions for the pressure-sensitive adhesive can be suitably selected, and when the pressure-sensitive adhesive is an acrylic pressure-sensitive adhesive, it is preferable to heat-dry at 90 to 120° C. for about 1 to 10 minutes from a viewpoint of removing a volatile component such as an organic solvent for diluting the acrylic pressure-sensitive adhesive and also suitably cross-linking by a cross-linking agent.

In another aspect, the present invention provides a double-sided adhesive tape. The double-sided adhesive tape of the present invention is a double-sided adhesive tape for adhering the synthetic resin material and the fabric together and has a shear strength of 15 mN/mm$^2$ or more at 140° C. as measured by using a standard resin sample formed of a polyimide resin and a standard fabric sample formed of a polyester fiber fabric bonded via the double-sided adhesive tape.

An increased shear strength measured under predetermined conditions of the double sided adhesive tape as described imparts good load-withstanding performance even at a very high temperature when the synthetic resin material and the fabric are adhered using the double-sided adhesive tape. Additionally, the workability when bonding the synthetic resin material and the fabric becomes good as described above. The shear strength at 140° C. was measured under the measurement conditions described in Example using a polyimide sheet ("Kapton 500H", manufactured by DU PONT-TORAY CO., LTD.) as the standard resin sample and a double raschel woven fabric (product name "Space Fabric", manufactured by SEIREN Co., LTD., basis weight 160 g/m$^2$, a product that uses a polyester fiber) as the standard fabric sample.

The double-sided adhesive tape has a shear strength at 140° C. of, from a viewpoint of imparting good load-withstanding performance at a very high temperature, preferably 15 mN/mm$^2$ or more, more preferably 25 mN/mm$^2$ or more, and further preferably 35 mN/mm$^2$ or more, and the above shear strength of the double-sided adhesive tape is, from a viewpoint of production easiness and practicality, for example, preferably 500 mN/mm$^2$ or less, more preferably 300 mN/mm$^2$ or less, and further preferably 100 mN/mm$^2$ or less.

The description of the specific structure of the double-sided adhesive tape in another aspect is omitted as it is the same as the double-sided adhesive tape used for the composite structure described above.

Example

Hereinafter, the present invention is described in reference to Examples but not limited to these Examples.

[Evaluation Method]

In the present invention, the measurement and the evaluation of each physical property were carried out by the following procedures.

<Weight-Average Molecular Weight and Degree of Dispersion>

The weight-average molecular weight (Mw) and the degree of dispersion (Mw/Mn) were measured using gel permeation chromatograph (manufactured by Waters Corporation, 2690 Separations Model). A sample was measured by GPC in the above apparatus by the conditions of a flow rate of 1 ml/min and a column temperature of 40° C., and a polystyrene-based molecular weight of the polymer was measured to determine a Mw and a Mw/Mn. GPC KF-806L (manufactured by SHOWA DENKO K.K.) was used as the column and a differential refractometer was used as the detector.

<Shear Strength at 140° C.>

A 12.5 mm×25 mm double-sided adhesive tape was bonded to a 30 mm×40 mm fabric. During this procedure, bonding was performed with the longer direction of the double-sided adhesive tape aligned with the width direction of the fabric and also with the double-sided adhesive tape disposed near the end of the fabric. The double-sided adhesive tape has one of the faces protected with a release sheet, and the other face unprotected with a release sheet was bonded to the fabric. The bonding of the double-sided adhesive tape was carried out using a pouch laminator (product name "Leon13DX", manufactured by LAMI CORPORATION INC.) at a speed: 9.

Subsequently, the release sheet on the double-sided adhesive tape was peeled, and the synthetic resin sheet (size 30 mm×40 mm, thickness 125 μm) was bonded to one of the faces of the double-sided adhesive tape by reciprocating a 2 kg-roller once thereby to obtain an evaluation sample 20 obtained by, as shown in in FIG. 1, bonding a synthetic resin sheet 21 and a fabric 22 by a double-sided adhesive tape 23.

Subsequently, using a table precision universal tester (product name "AGS-X", manufactured by SHIMADZU CORPORATION), the synthetic resin sheet 21 and the fabric 22 were held respectively and the evaluation sample 20 was pulled in the shear direction at a speed of 200 mm/min, and the maximum load was defined as the shear strength.

<Shear Strength at 140° C. after Cooling/Heating Cycle over Time>

A 12.5 mm×25 mm double-sided adhesive tape was bonded to a 30 mm×40 mm fabric. During this procedure, the tape and the fabric were bonded with the longer direction of the double-sided adhesive tape aligned with the width direction of the fabric, and also with the double-sided adhesive tape disposed near the end of the fabric. The double-sided adhesive tape has one of the faces protected with a release sheet, and the other face unprotected with a release sheet was bonded to the fabric. The bonding of the double-sided adhesive tape was carried out using a pouch laminator (product name "Leon13DX", manufactured by LAMI CORPORATION INC.) at a speed: 9.

Subsequently, the release sheet on the double sided adhesive tape was peeled, and the synthetic resin sheet (size 30 mm×40 mm, thickness 125 μm) was bonded to one of the faces of the double-sided adhesive tape by reciprocating a 2 kg-roller once thereby to obtain an evaluation sample 20 obtained by, as shown in in FIG. 1, bonding a synthetic resin sheet 21 and a fabric 22 by a double-sided adhesive tape 23.

The bonded test piece, using a thermal shock chamber (product name "TSA-103EL-A", manufactured by ESPEC CORP.), was subjected to 1000 cycles of a step in which temperatures were changed alternately between 140° C.×30 min and −30° C.×30 min. Subsequently, using a table precision universal tester (product name "AGS-X", manufactured by SHIMADZU CORPORATION), the synthetic resin sheet 21 and the fabric 22 were held respectively and the evaluation sample 20 was pulled in the shear direction at a speed of 200 mm/min, and the maximum load was defined as the shear strength.

<Load-Withstanding Evaluation at 140° C.>

A 12.5 mm×25 mm double-sided adhesive tape was bonded to a 30 mm×40 mm fabric. During this procedure, the tape and the fabric were bonded with the longer direction of the double-sided adhesive tape aligned with the width direction of the fabric, and also with the double-sided adhesive tape disposed near the end of the fabric. The double-sided adhesive tape has one of the faces protected with a release sheet, and the other face unprotected with a release sheet was bonded to the fabric. The bonding of the double-sided adhesive tape was carried out using a pouch laminator (product name "Leon13DX", manufactured by LAMI CORPORATION INC.) at a speed: 9.

Figure 2:
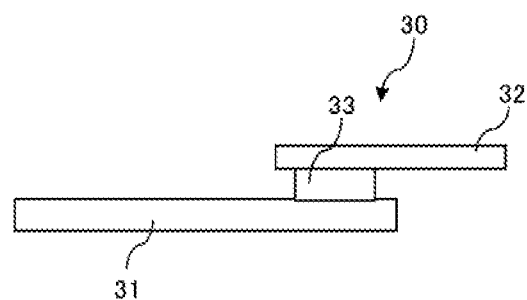
FIG. 2 is a side view of an evaluation sample used for load-withstanding evaluation at 140° C.

Subsequently, the release sheet on the double-sided adhesive tape was peeled, and an SUS plate (size 50 mm×75 mm, thickness 3 mm) was bonded to one of the faces of the double-sided adhesive tape by reciprocating a 2 kg-roller once thereby to obtain an evaluation sample 30 obtained by, as shown in in FIG. 2, bonding an SUS plate 31 and a fabric 32 by a double-sided adhesive tape 33.

Figure 3:
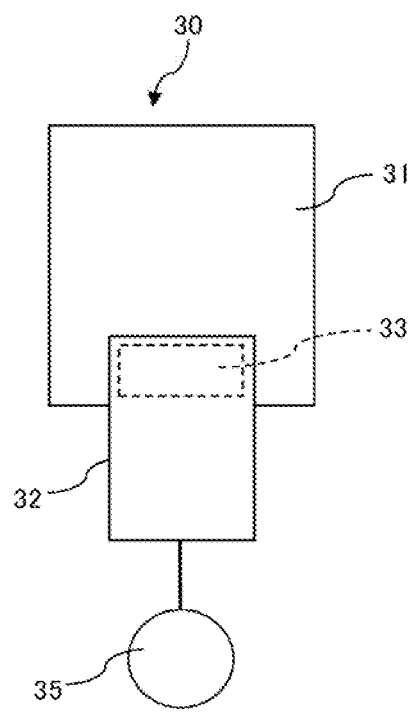
FIG. 3 is a plan view showing an evaluation method of a load-withstanding evaluation test.

The evaluation sample was heated by allowing to stand for 30 minutes at 140° C. environment in a thermostat chamber, then a 100 g-weight 35 was hung at the lower end of the fabric 32 of the evaluation sample 30 as shown in FIG. 3, and the evaluation sample 30 was disposed along with the vertical direction at 140° C. environment to measure the time required for the weight 35 to fall down. The weight 35 was changed to a 200 g-weight to similarly measure the time required for the weight 35 to fall down, and the evaluations were made by the following evaluation criteria.

A: Neither 100 g- or 200 g-weight fell down for 2 hours or more.
B: A 200 g-weight fell down in less than 2 hours but a 100 g-weight did not fall down for 2 hours or more.
C: Both 100 g- and 200 g-weights fell down in less than 2 hours.

<Texture Evaluation>

Any bleeding of the adhesive or the pressure-sensitive adhesive found on the fabric surface of the evaluation samples created for the 140° C. shear strength measurement was evaluated as "NG", and if not, evaluated as "OK".

(Preparation of an Organic Tellurium Polymerization Initiator)

A quantity of 6.38 g (50 mmol) of tellurium (40 mesh, metal tellurium, manufactured by Sigma-Aldrich) was suspended in 50 mL of tetrahydrofuran (THF), and 34.4 mL (55 mmol) of a 1.6 mol/L n-butyllithium/hexane solution (manufactured by Sigma-Aldrich) was slowly added dropwise thereto at room temperature. This reaction solution was stirred until the metal tellurium completely disappeared. A quantity of 10.7 g (55 mmol) of ethyl-2-bromo-isobutyrate was added to this reaction solution at room temperature and stirred for 2 hours. After completion of the reaction, the solvent was concentrated under reduced pressure and subsequently distilled under reduced pressure thereby to obtain 2-methyl-2-n-butylteranyl-ethylpropionate as a yellow oily matter.

(Preparation of Acrylic Pressure-Sensitive Adhesive A-1)

In a glove box purged with argon, 38 μL of 2-methyl-2-n-butylteranyl-ethylpropionate prepared above, 2.8 mg of V-60 (2,2'-azobisisobutylonitrile, manufactured by Wako Pure Chemical Industries, Ltd.), and 1 mL of ethyl acetate were introduced to a reaction vessel, then the reaction vessel was hermetically closed and taken out from the glove box. Subsequently, 2-ethylhexylacrylate (2EHA), acrylic acid (AAc), and 2-hydroxyethylacrylate (HEA) were introduced into the reaction vessel in the ratio shown in Table 1 so that the total was 100 g while inflowing an argon gas into the reaction vessel. Additionally, 66.5 g of ethyl acetate was introduced as a polymerization solvent to carry out a polymerization reaction at 60° C. for 20 hours thereby to obtain an acrylic-based polymer (A)-containing solution by living radical polymerization. A weight-average molecular weight and a degree of dispersion of the acrylic-based polymer (A) were as shown in Table 1.

Relative to 100 parts by mass (based on non-volatile content) of the above acrylic-based polymer (A)-containing solution, 7.2 parts by mass of the cross-linking agent, the component (B), 7 parts by mass of the rosin-based resin 1, the component (C), 7 parts by mass of the rosin-based resin 2, and 7 parts by mass of the terpene phenolic-based resin were added to prepare an acrylic pressure-sensitive adhesive A-1.

(Preparation of Acrylic Pressure-Sensitive Adhesive A-2)

In a glove box purged with argon, 38 μL of 2-methyl-2-n-butylteranyl-ethylpropionate prepared above, 2.8 mg of V-60 (2,2'-azobisisobutylonitrile, manufactured by Wako Pure Chemical Industries, Ltd.), and 1 mL of ethyl acetate were introduced to a reaction vessel, then the reaction vessel was hermetically closed and taken out from the glove box. Subsequently, 2-ethylhexylacrylate (2EHA), acrylic acid (AAc), and 2-hydroxyethylacrylate (HEA) were introduced into the reaction vessel in the ratio shown in Table 1 so that the total was 100 g while inflowing an argon gas into the reaction vessel. Additionally, 66.5 g of ethyl acetate was introduced as a polymerization solvent to carry out a polymerization reaction at 60° C. for 20 hours thereby to obtain an acrylic-based polymer (A)-containing solution by living radical polymerization. A weight-average molecular weight and a degree of dispersion of the acrylic-based polymer (A) were as shown in Table 1.

Relative to 100 parts by mass (based on non-volatile content) of the above acrylic-based polymer (A)-containing solution, 7.2 parts by mass of the cross-linking agent, the component (B) and 30 parts by mass of the rosin-based resin 1, the component (C) were added to prepare an acrylic pressure-sensitive adhesive A-2.

(Preparation of Acrylic Pressure-Sensitive Adhesive B)

A reactor equipped with a thermometer, a stirrer, a cooling tube, and a dropping funnel was charged with a solution in which a monomer mixture containing 100 parts by mass of n-butyl acrylate (BA) and acrylic acid (AAc) in a ratio shown in Table 1 was dissolved in 100 parts by mass of ethyl acetate. Six mmol of lauroyl peroxide, a polymerization initiator, was added thereto and polymerization was carried out for 10 hours under reflux thereby to obtain an acrylic polymer solution. A weight-average molecular weight and a degree of dispersion of the acrylic-based polymer (A) were as shown in Table 1.

Relative to 100 parts by mass (based on non-volatile content) of the above acrylic copolymer solution, 2.4 parts by mass of the cross-linking agent, the component (B), and 7 parts by mass of the rosin-based resin 1, the component (C), were added to prepare an acrylic pressure-sensitive adhesive B.

(Preparation of Acrylic Pressure-Sensitive Adhesive C)

A reactor equipped with a thermometer, a stirrer, a cooling tube, and a dropping funnel was prepared. The reactor was charged with a solution in which a monomer mixture containing n-butyl acrylate (BA), 2-ethylhexylacrylate (2EHA), vinyl acetate (VAC), acrylic acid (AAc), and 2-hydroxyethylacrylate (HEA) in a ratio shown in Table 1 was dissolved in 100 parts by mass of ethyl acetate. Six mmol of lauroyl peroxide, a polymerization initiator, was added thereto and polymerization was carried out for 10 hours under reflux thereby to obtain an acrylic polymer solution. A weight-average molecular weight and a degree of dispersion of the acrylic-based polymer (A) were as shown in Table 1.

Relative to 100 parts by mass (based on non-volatile content) of the above acrylic copolymer solution, 0.8 parts by mass of the cross-linking agent, the component (B), 14 parts by mass of the rosin-based resin 3, the component (C), and 10 parts by mass of the rosin-based resin 4 were added to prepare an acrylic pressure-sensitive adhesive C.

Example 1

(Making of the Double-Sided Adhesive Tape)

The acrylic pressure-sensitive adhesive A-1 was applied onto a release sheet ("SLB-80WD" manufactured by Sumika-kakoushi Co., Ltd.), a substrate, and heat-dried at 110° C. for 2 minutes, then released from the substrate thereby to obtain a double-sided adhesive tape consisting only of the pressure-sensitive adhesive layer formed from the acrylic pressure-sensitive adhesive and having a thickness of 30 μm. For the fabric, a polyester fiber fabric (PET fiber fabric, product name "Space Fabric", manufactured by SEIREN Co., LTD., basis weight 160 g/m$^2$, a product that uses a polyester fiber) was prepared, and for the synthetic resin sheet, a polyimide sheet ("Kapton 500H", manufactured by DU PONT-TORAY CO., LTD., a thickness of 125 μm) was prepared. An evaluation sample formed of the composite structure was created using the double-sided adhesive tape, the polyimide sheet, and the polyester fiber fabric in accordance with each evaluation method.

Example 2

The same procedure was carried out as in Example 1 in the exception that the thickness of the double-sided adhesive tape was changed as shown in Table 2.

Example 3

The same procedure was carried out as in Example 1 in the exception that the acrylic pressure-sensitive adhesive A-1 was changed to the acrylic pressure-sensitive adhesive A-2.

Example 4

The same procedure was carried out as in Example 1 in the exception that the acrylic pressure-sensitive adhesive A-1 was changed to the acrylic pressure-sensitive adhesive B.

Examples 5 and 6

The same procedure was carried out as in Example 4 in the exception that the thickness of the double-sided adhesive tape was changed as shown in Table 2.

Comparative Example 1

The same procedure was carried out as in Example 1 in the exception that the acrylic pressure-sensitive adhesive A-1 was changed to the acrylic pressure-sensitive adhesive C.

Comparative Examples 2 and 3

The same procedure was carried out as in Comparative Example 1 in the exception that the thickness of the double-sided adhesive tape was changed as shown in Table 2.

Comparative Example 4

A commercial two-component epoxy adhesive ("BE-STONE PM4" manufactured by TOHTO Chemical Industry Co., Ltd.) was used in place of the acrylic pressure-sensitive adhesive A to create an evaluation sample by mixing and applying in a ratio of a base resin:curing agent=1:1. The evaluation sample was created by applying the two-component epoxy adhesive onto the fabric, then bonding the fabric and the synthetic resin sheet and allowing to stand at 140° C. for 2 hours.

TABLE 1

|  |  | Pressure-sensitive adhesive A-1 | Pressure-sensitive adhesive A-2 | Pressure-sensitive adhesive B | Pressure-sensitive adhesive C |
|---|---|---|---|---|---|
| Acrylic-based polymer (A) monomer components (part by mass) | BA |  |  | 100 | 55 |
|  | 2EHA | 100 | 100 |  | 40 |
|  | VAC |  |  |  | 5 |
|  | AAc | 5 | 5 | 11 | 1 |
|  | HEA | 0.1 | 0.1 |  | 0.2 |
| Cross-linking agent (B) (part by mass) | L-45E | 7.2 | 7.2 | 2.4 | 0.8 |
| Tedder resin (C) (part by mass) | Rosin-based resin 1 D135 | 7 | 30 | 7 |  |
|  | Rosin-based resin 2 KE359 | 7 |  |  |  |
|  | Rosin-based resin 3 ESTER GUM H |  |  |  | 14 |
|  | Rosin-based resin 4 HARITACK PCJ |  |  |  | 10 |
|  | Terpene phenolic-based resin G150 | 7 |  |  |  |
| Molecular weight | Mw (10000) | 82 | 82 | 72 | 70 |
|  | Mw/Mn | 1.8 | 1.8 | 6.0 | 7.2 |

* Part by mass of cross-linking agent and tackifier resin is the part by mass based on 100 parts by mass of the acrylic-based polymer The cross-linking agent and the tackifier resins shown in Table 1 are as follows.
(Cross-Linking Agent (B))
  Isocyanate cross-linking agent: "Coronate L-45E" manufactured by TOSOH CORPORATION
(Tackifier Resin (C))
  Rosin-based resin 1: rosin-based resin, "PENSEL D-135" manufactured by Arakawa Chemical Industries, Ltd.
  Rosin-based resin 2: rosin-based resin, "KE359" manufactured by Arakawa Chemical Industries, Ltd.
  Rosin-based resin 3: rosin-based resin, "ESTER GUM H" manufactured by Arakawa Chemical Industries, Ltd.
  Rosin-based resin 4: rosin-based resin, "HARITACK PCJ" manufactured by Harima Chemicals Inc.
  Terpene phenolic-based resin: "YS Polyster G150" manufactured by YASUHARA CHEMICAL CO., LTD.

TABLE 2

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Synthetic resin material | Kind | Polyimide | Polyimide | Polyimide | Polyimide | Polyimide | Polyimide | Polyimide | Polyimide | Polyimide |
|  | Thickness (μm) | 125 | 125 | 125 | 125 | 125 | 125 | 125 | 125 | 125 |
| Fabric | Material (fiber) | Polyester | Polyester | Polyester | Polyester | Polyester | Polyester | Polyester | Polyester | Polyester |
|  | Basis weight (g/m²) | 160 | 160 | 160 | 160 | 160 | 160 | 160 | 160 | 160 |
| Double-sided adhesive tape | Kind | Pressure-sensitive adhesive A-1 | Pressure-sensitive adhesive A-1 | Pressure-sensitive adhesive A-2 | Pressure-sensitive adhesive B | Pressure-sensitive adhesive B | Pressure-sensitive adhesive B | Pressure-sensitive adhesive C | Pressure-sensitive adhesive C | Pressure-sensitive adhesive C |
|  | Polymerization method | Living | Living | Living | Free | Free | Free | Free | Free | Free |

TABLE 2-continued

|  | Example | | | | | | Comparative Example | | |
|---|---|---|---|---|---|---|---|---|---|
|  | 1 | 2 | 3 | 4 | 5 | 6 | 1 | 2 | 3 |
| Thickness (μm) | 30 | 50 | 30 | 30 | 50 | 70 | 30 | 50 | 70 |
| 140° C. Shear strength (mN/mm²) | 36.2 | 48.3 | 40.8 | 17.6 | 30.4 | 45.8 | 6.7 | 9.9 | 13.0 |
| 140° C. Shear strength (mN/mm²) [After cooling/heating cycle] | 28.0 | 39.0 | 38.4 | 15.7 | 28.6 | 33.2 | 7.0 | 10.8 | 14.1 |
| 140° C. Load-withstanding evaluation | A | A | A | B | B | A | C | C | C |

As shown in the above Examples, a shear strength at 140° C. of a predetermined value or more was capable of imparting good load-withstanding performance at a very high temperature to the composite structure. To the contrary, a shear strength at 140° C. of less than a predetermined value caused insufficient load-withstanding performance as shown in Comparative Examples.

TABLE 3

|  |  | Example | | Comparative Example |
|---|---|---|---|---|
|  |  | 1 | 6 | 4 |
| Synthetic resin material | Kind | Polyimide | Polyimide | Polyimide |
|  | Thickness (μm) | 125 | 125 | 125 |
| Fabric | Material (fiber) | Polyester | Polyester | Polyester |
|  | Basis weight (g/m²) | 160 | 160 | 160 |
| Double-sided adhesive tape (adhesive) | Kind | Pressure-sensitive arthesive A-1 | Pressure-sensitive adhesive B | Two-component adhesive |
|  | Polymerization method | Living | Free | — |
|  | Thickness (μm) | 30 | 70 | 30 |
| Sensory evaluation | Fabric texture | OK | OK | NG |
|  | Workability | OK | OK | NG |

Additionally, Examples 1 and 6 and Comparative Example 4 were confirmed for the texture of the fabric as shown in Table 3, and Examples 1 and 6 in which the double-sided adhesive tape was used had excellent textures without bleeding of the pressure-sensitive adhesives out to the fabric surface. To the contrary, in comparative Example 4 in which the liquid two-component adhesive was used, the adhesive was bled out to the fabric surface and thereby the texture of the fabric was affected.

Further, in each Example, an increased shear strength was immediately assured when the fabric and the synthetic resin material were bonded. Additionally, even after when the fabric and the double-sided adhesive tape were bonded and allowed to stand for an extended period of time (for example, about 1 week), such a fabric can still be bonded to the synthetic resin sheet via the double-sided adhesive tape. Thus, the fabric and the double-sided adhesive tape were able to be stored for a certain period of time in the state of being bonded, hence excellent in the workability.

In contrast, Comparative Example 4 required a lot of time to bond the fabric and the synthetic resin material. Further, the adhesive cured in a predetermined time once applied onto the fabric, and thus the fabric was incapable of being stored with the pressure-sensitive adhesive being applied thereto, which led to poor workability.

REFERENCE SIGNS LIST 20, 30 Evaluation sample
21 Synthetic resin sheet
22, 32 Fabric
23, 33 Double-sided adhesive tape
31 SUS Plate
35 Weight

The invention claimed is:
1. A composite structure comprising a synthetic resin material, a fabric, and a double-sided adhesive tape that is disposed between the synthetic resin material and the fabric and bonds them together, the composite structure having a shear strength at 140° C. of 15 mN/mm² or more,
    wherein the synthetic resin material is a polyimide-based resin,
    the fabric is a polyester fiber fabric,
    the double-sided adhesive tape comprises a pressure-sensitive adhesive layer made of an acrylic pressure-sensitive adhesive,
    the acrylic pressure-sensitive adhesive comprises an acrylic-based polymer (A), and
    the acrylic-based polymer (A) is a copolymer of monomer components comprising 100 parts by mass of an alkyl (meth)acrylate monomer (A1) and 4 to 18 parts by mass of a carboxyl group-containing monomer (X1).
2. The composite structure according to claim 1, wherein the double-sided adhesive tape is a base material-free double-sided adhesive tape.
3. The composite structure according to claim 1, wherein the double-sided adhesive tape is adhered directly to the fabric.
4. The composite structure according to claim 1, wherein the double-sided adhesive tape has a thickness of 100 μm or less.

5. The composite structure according to claim 1, wherein the double-sided adhesive tape is bonded throughout the entire fabric.

6. The composite structure according to claim 1, wherein the acrylic-based polymer (A) has a weight-average molecular weight of 300000 to 2000000 and a degree of dispersion of 2.5 or less.

7. A double-sided adhesive tape for adhering a synthetic resin material and a fabric together,
- the double-sided adhesive tape having a shear strength at 140° C. of 15 mN/mm$^2$ or more as measured by using a standard resin sample formed of a polyimide resin and a standard fabric sample formed of a polyester fiber fabric bonded via the double-sided adhesive tape,
- wherein the double-sided adhesive tape comprises a pressure-sensitive adhesive layer made of an acrylic pressure-sensitive adhesive,
- the acrylic pressure-sensitive adhesive comprises an acrylic-based polymer (A), and
- the acrylic-based polymer (A) is a copolymer of monomer components comprising 100 parts by mass of an alkyl (meth)acrylate monomer (A1) and 4 to 18 parts by mass of a carboxyl group-containing monomer (X1).

\* \* \* \* \*